(12) United States Patent
Usa et al.

(10) Patent No.: US 10,336,269 B2
(45) Date of Patent: Jul. 2, 2019

(54) SADDLE-RIDE TYPE VEHICLE

(71) Applicant: HONDA MOTOR CO., LTD., Minato-Ku, Tokyo (JP)

(72) Inventors: Masanori Usa, Wako (JP); Keisuke Kishikawa, Wako (JP); Shun Niijima, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 193 days.

(21) Appl. No.: 15/450,563

(22) Filed: Mar. 6, 2017

(65) Prior Publication Data

US 2017/0282818 A1    Oct. 5, 2017

(30) Foreign Application Priority Data

Mar. 30, 2016 (JP) ................................. 2016-067855

(51) Int. Cl.
| | | |
|---|---|---|
| *B60R 16/023* | (2006.01) | |
| *B60T 8/171* | (2006.01) | |
| *B60T 8/36* | (2006.01) | |
| *B60T 8/17* | (2006.01) | |
| *B62K 19/38* | (2006.01) | |
| *B62K 19/40* | (2006.01) | |
| *B62L 1/00* | (2006.01) | |

(Continued)

(52) U.S. Cl.
CPC .......... *B60R 16/0239* (2013.01); *B60T 8/171* (2013.01); *B60T 8/1706* (2013.01);
(Continued)

(58) Field of Classification Search
CPC . B60R 16/0239; B62J 1/14; B62J 2099/0013; B62J 2099/002; B62K 11/04;
(Continued)

(56) References Cited

U.S. PATENT DOCUMENTS

2007/0213904 A1* 9/2007 Watanabe ............. B60T 8/1706
701/45
2010/0206653 A1 8/2010 Koike
(Continued)

FOREIGN PATENT DOCUMENTS

| EP | 2492174 A2 | 8/2012 |
| EP | 2738075 A1 | 6/2014 |

(Continued)

OTHER PUBLICATIONS

Extended European Search Report dated Oct. 2, 2017 in the Corresponding European Patent Application 17159403.9.
(Continued)

*Primary Examiner* — Joseph M Rocca
*Assistant Examiner* — Maurice L Williams
(74) *Attorney, Agent, or Firm* — Carrier Blackman & Associates, P.C.; Joseph P. Carrier; Jeffrey T. Gedeon

(57) ABSTRACT

One embodiment provides a saddle-ride type vehicle. The vehicle includes a main frame; a drive source supported by a lower side of the main frame; an energy storing part supported by an upper side of the main frame; a front wheel steerably supported via a front fork mounted on a front side of the main frame; a rear wheel supported via a swing arm mounted on a rear side of the main frame and configured to be driven by the drive source; and seat frames disposed on the rear side of the main frame to support a riding seat. A braking control device is disposed within a lateral width between the seat frames, and is supported by a rear fender supported by the seat frame via a vibration control member. And, an inertia measuring device is supported by the braking control device.

7 Claims, 11 Drawing Sheets

(51) Int. Cl.
  *B62K 11/04* (2006.01)
  *B62J 99/00* (2009.01)
  *B62J 1/14* (2006.01)
  *B62K 25/28* (2006.01)
  *B62J 15/00* (2006.01)
  *F16F 1/373* (2006.01)

(52) U.S. Cl.
  CPC ............ *B60T 8/3685* (2013.01); *B62J 99/00* (2013.01); *B62K 11/04* (2013.01); *B62K 19/38* (2013.01); *B62K 19/40* (2013.01); *B62L 1/00* (2013.01); *B62J 1/14* (2013.01); *B62J 15/00* (2013.01); *B62J 2099/002* (2013.01); *B62J 2099/0013* (2013.01); *B62K 25/283* (2013.01); *F16F 1/3732* (2013.01)

(58) Field of Classification Search
  CPC ........... B62K 19/38; B62K 19/40; B62L 1/00; B60T 8/1706; B60T 8/171; B60T 8/3685; F16F 1/3732
  See application file for complete search history.

(56) References Cited

U.S. PATENT DOCUMENTS

| | | | |
|---|---|---|---|
| 2011/0163516 A1* | 7/2011 | Whinnery | B60T 8/1706 |
| | | | 280/296 |
| 2012/0259479 A1 | 10/2012 | Yoneta et al. | |
| 2014/0358329 A1 | 12/2014 | Morishima et al. | |
| 2016/0009275 A1 | 1/2016 | Hieda et al. | |
| 2016/0160763 A1* | 6/2016 | Matsuda | F02D 9/1095 |
| | | | 123/403 |
| 2016/0232802 A1 | 8/2016 | Nomura et al. | |
| 2016/0325739 A1* | 11/2016 | Litz | B60W 30/04 |
| 2017/0259872 A1 | 9/2017 | Iwamoto | |

FOREIGN PATENT DOCUMENTS

| | | |
|---|---|---|
| JP | 59193785 U | 12/1984 |
| JP | 2007-271605 A | 10/2007 |
| JP | 2010188758 A | 9/2010 |
| JP | 2010228621 A | 10/2010 |
| JP | 2010228676 A | 10/2010 |
| JP | 2013014945 A | 1/2013 |
| JP | 2013166555 A | 8/2013 |
| JP | 2013220661 A | 10/2013 |
| JP | 2014069696 A | 4/2014 |
| JP | 2014201173 A | 10/2014 |
| JP | 2015071330 A | 4/2015 |
| JP | 2016016726 A | 2/2016 |
| JP | 2017159806 A | 9/2017 |

OTHER PUBLICATIONS

Office Action dated Oct. 3, 2017 in the Corresponding Japanese Patent Application 2016-067855.

* cited by examiner

SADDLE-RIDE TYPE VEHICLE

CROSS-REFERENCE TO RELATED APPLICATION(S)

This application claims priority from Japanese Patent Application No. 2016-067855 filed on Mar. 30, 2016, the entire contents of which are incorporated herein by reference.

FIELD

The present invention relates to a saddle-ride type vehicle, and more particularly to a saddle-ride type vehicle having an inertia measuring device which detects a state of a vehicle.

BACKGROUND

For example, JP-2007-271605-A discloses an exemplary saddle-ride type vehicle in which acceleration sensors in an X axis direction and a Z axis direction of a motorcycle are disposed in front of a brake hydraulic unit.

In the same manner as the acceleration sensors disclosed in JP-2007-271605-A, there may be used an inertia measuring device as a device which detects a state of a vehicle. The inertia measuring device is configured such that detection information detected by the inertia measuring device is supplied to a control device and the control device is operated based on the detection information so that safety of the vehicle is enhanced. Accordingly, in the inertia measuring device, to enhance the detection accuracy of the inertia measuring device, it is desirable that vibrations of a power source such as an engine or vibrations of a road surface be not transmitted to the inertia measuring device. In mounting the inertia measuring device, it may be possible to mount the inertia measuring device via a vibration control structure or a vibration absorbing structure. However, when a special mounting structure is adopted for mounting the inertia measuring device, there arises a drawback such as the increase of the number of parts or the increase of a weight of the saddle-ride type vehicle.

SUMMARY

One object of the present invention is to provide a saddle-ride type vehicle which can suppress the transmission of vibrations of a power source or vibrations of a road surface to an inertia measuring device while suppressing the increase of the number of parts or the increase of a weight of the saddle-ride type vehicle.

To achieve the above-mentioned object, the invention provides following Aspects 1-8.

1. A saddle-ride type vehicle including:
   a main frame;
   a drive source supported by a lower side of the main frame;
   an energy storing part supported by an upper side of the main frame;
   a front wheel steerably supported via a front fork mounted on a front side of the main frame;
   a rear wheel supported via a swing arm mounted on a rear side of the main frame and configured to be driven by the drive source;
   seat frames disposed on the rear side of the main frame to support a riding seat;
   a braking control device disposed within a lateral width between the seat frames and configured to control braking of the front wheel or the rear wheel; and
   an inertia measuring device configured to measure inertias in X, Y and Z axes of the vehicle,
   wherein the braking control device is supported by a rear fender supported by the seat frame via a vibration control member, and
   wherein the inertia measuring device is supported by the braking control device.

2. The vehicle of Aspect 1,
   wherein the braking control device is supported by a bolt fastened to the rear fender via the vibration control member, and
   wherein the inertia measuring device is supported by a mounting bracket which is co-fastened to the bolt.

3. The vehicle of Aspect 2,
   wherein the braking control device is disposed in a frontwardly and downwardly inclined manner, and
   wherein the mounting bracket is disposed in front of and below the braking control device, and is co-fastened to the inertia measuring device by the bolt.

4. The vehicle of Aspect 2,
   wherein the mounting bracket includes an engaging portion which engages with the rear fender and restricts the rotation of the mounting bracket.

5. The vehicle of any one of Aspects 2 to 4,
   wherein the rear fender is supported by the seat frame via a placing portion on which the rear fender is placed by being caught by an upper surface of the seat frame, and
   wherein the riding seat is disposed above the rear fender.

6. The vehicle of any one of Aspects 1 to 5,
   wherein the inertia measuring device is disposed behind the energy storing part and in front of the braking control device, and the inertia measuring device is disposed at a height where the inertia measuring device overlaps with the energy storing part and the braking control device in a longitudinal direction of the vehicle.

7. The vehicle of Aspect 6,
   wherein the inertia measuring device is covered by an inertia measuring device cover from above, and the inertia measuring device cover is brought into contact with the energy storing part and is supported by the seat frame.

8. A saddle-ride type vehicle including:
   a main frame;
   a drive source supported by a lower side of the main frame;
   an energy storing part supported by an upper side of the main frame;
   a front wheel steerably supported via a front fork mounted on a front side of the main frame;
   a rear wheel supported via a swing arm mounted on a rear side of the main frame and configured to be driven by the drive source;
   seat frames disposed on the rear side of the main frame to support a riding seat;
   a braking control device disposed within a lateral width between the seat frames and configured to control braking of the front wheel or the rear wheel; and
   an inertia measuring device configured to measure inertias in X, Y and Z axes of the vehicle,
   wherein the inertia measuring device is supported by a storing part mounting bracket provided to the energy storing part via a vibration control member.

According to Aspect 1, the braking control device is disposed within a lateral width between the seat frames, and is supported by the rear fender which is supported by the seat frame via the vibration control member, and the inertia measuring device is supported by the braking control device. With such a configuration, the inertia measuring device is brought into a state where the inertia measuring device is mounted via the vibration control member of the braking control device disposed below the riding seat between the seat frames. Accordingly, the braking control device can be mounted without additionally providing the mounting structure such as a vibration isolation member for the inertia measuring device. That is, the inertia measuring device is supported by the braking control device which is a heavy object and hence, vibrations transmitted to the inertia measuring device can be reduced so that inertia measuring accuracy can be enhanced.

According to Aspect 2, the braking control device is supported on the rear fender by the bolt via the vibration control member, and the inertia measuring device is supported by the mounting bracket which is co-fastened also by this bolt. Accordingly, it is unnecessary to provide the vibration control member or the bolt exclusively for mounting the inertia measuring device and hence, the number of parts can be reduced and the increase of the weight can be prevented.

According to Aspect 3, the braking control device is disposed in a frontwardly and downwardly inclined manner, and the mounting bracket is disposed in front of and below the braking control device so that the mounting bracket is co-fastened to the inertia measuring device by the bolt. Accordingly, the weight of the braking control device is received by two vibration control members, and the weight of the braking control device can be placed also on the mounting bracket.

According to Aspect 4, the mounting bracket includes the engaging portion which engages with the rear fender and restricts the rotation of the mounting bracket and hence, even when the number of bolts for fixing the mounting bracket is set to one, it is possible to surely fix the mounting bracket without causing the rotation of the mounting bracket. Accordingly, the increase of the number of parts and the increase of the weight can be suppressed without additionally providing bolts for fixing the mounting bracket and a vibration control member.

According to Aspect 5, the rear fender is supported by the seat frame via the placing portion on which the rear fender is placed by being caught by an upper surface of the seat frame, and the riding seat is disposed above the rear fender. Accordingly, the seat frame which surrounds the inertia measuring device and the rear fender are not fixed by the fastening means such as bolts and hence, the transmission of vibrations or a stress to the inertia measuring device is alleviated whereby the transmission of vibrations to the inertia measuring device can be effectively suppressed.

According to Aspect 6, the inertia measuring device is disposed at the position where the inertia measuring device is sandwiched between the energy storing part and the braking control device which are heavy objects from a front side and a back side at the same height as the energy storing part and the braking control device. Accordingly, the inertia measuring device can be disposed at the position higher than a power source and hence, inclination detection accuracy in the lateral direction of the vehicle can be improved. The inertia measuring device is, together with the braking control device, disposed behind the energy storing part, that is, disposed on a rear portion of the vehicle body and hence, detection accuracy of detecting pitching which is a phenomenon that the rear wheel comes off from a ground can be preferably enhanced.

According to Aspect 7, the inertia measuring device cover is brought into contact with the energy storing part and is supported by the seat frame and hence, the inertia measuring device cover can be surely supported by the energy storing part and the seat frame. Supporting of the inertia measuring device cover by the energy storing part is realized by bringing the inertia measuring device cover into contact with the energy storing part and hence, it is unnecessary to provide a particular structure for supporting such as bosses on the energy storing part whereby it is possible to prevent the structure from becoming complicated and from increasing a weight thereof.

According to Aspect 8, the energy storing part is supported by the main frame, and the inertia measuring device is supported by the storing part mounting bracket provided to the energy storing part via the vibration control member. Accordingly, the inertia measuring device can be disposed on an upper portion of a vehicle body, and the inertia measuring device is supported by the energy storing part which is a heavy object via the vibration control member and hence, vibrations can be reduced. As a result, measurement accuracy of the inertia measuring device can be enhanced.

DETAILED DESCRIPTION

Figure 1:
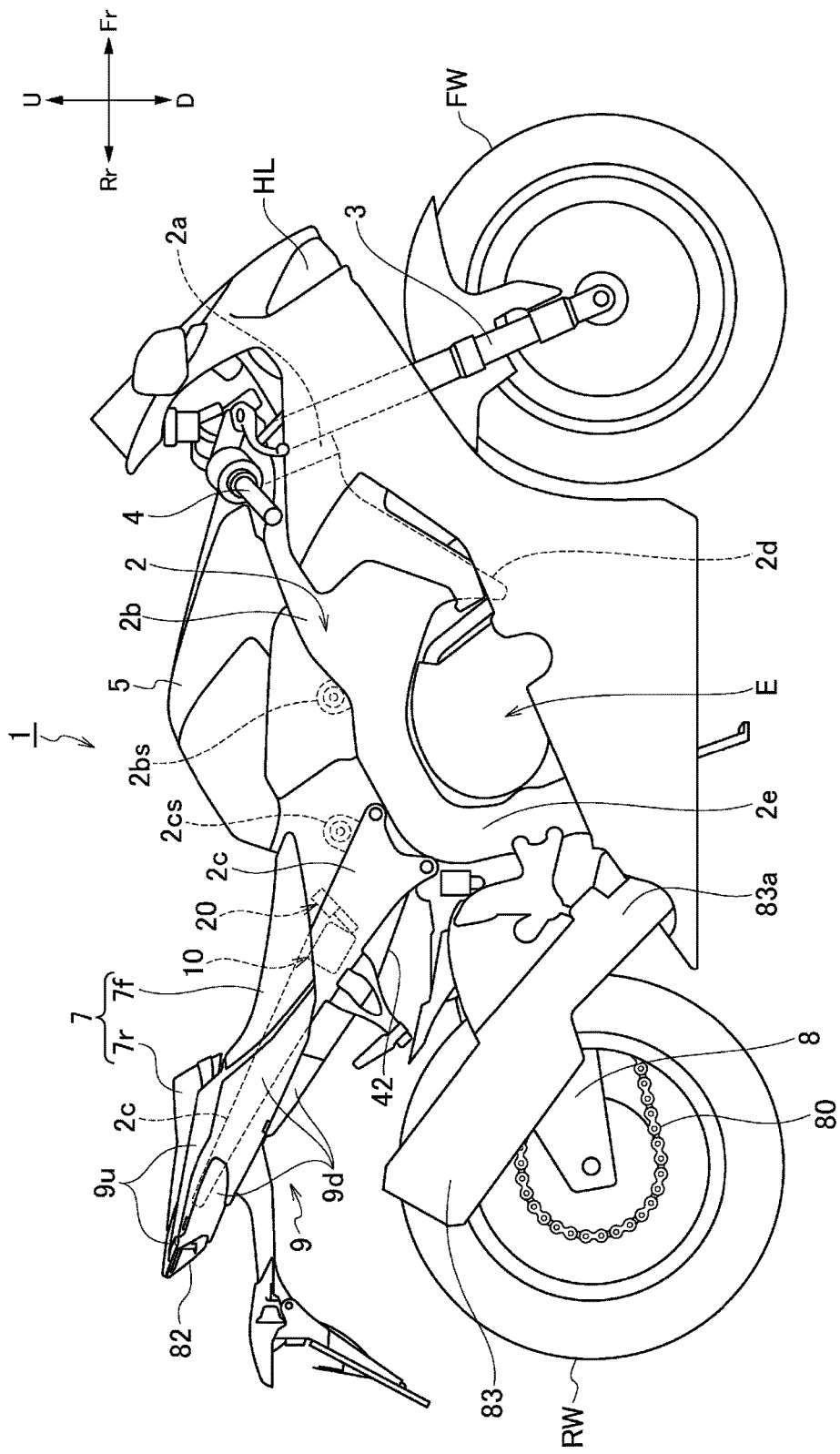
FIG. 1 is a right side view of a saddle-ride type vehicle according to a first embodiment.

Hereinafter, saddle-ride type vehicles according to respective embodiments are described with reference to attached drawings. The drawings are viewed in the direction of symbols and, in the explanation made hereinafter, directions such as "front", "rear", "left", "right", "up" and "down" are described in accordance with directions as viewed from a rider. In the drawings, symbol Fr indicates a front side of the vehicle, symbol Rr indicates a rear side of the vehicle, symbol L indicates a left side of the vehicle, symbol R indicates a right side of the vehicle, symbol U indicates an upper side of the vehicle, and symbol D indicates a lower side of the vehicle.

First Embodiment

Hereinafter, a first embodiment is described with reference to FIG. 1 to FIG. 8.

In FIG. 1, a vehicle body frame 2 of a saddle-ride type vehicle 1 which is a motorcycle includes: a head pipe 2a which steerably supports a front fork 3 pivotally supporting a front wheel FW and a handle 4; a main frame 2b which extends rearward and downward from the head pipe 2a; a pivot frame 2e which is connected to a rear portion of the main frame 2b and extending downward; a pair of left and right seat frames 2c which is connected to the pivot frame 2e and is inclined rearward and upward; and a down frame 2d which is connected to a front end portion of the main frame 2b and extends rearward and downward at a steeper angle than the main frame 2b. An engine E is disposed below the main frame 2b and in front of the pivot frame 2e. The engine E is supported by a lower end portion of a down frame 2d and the pivot frame 2e on a lower side of the main frame 2b in a state where the engine E is surrounded by the main frame 2b, the down frame 2d and the pivot frame 2e.

A fuel tank 5 which forms an energy storing part is disposed above the main frame 2b. A tandem-type riding seat 7 formed of a rider's seat 7f on which a rider is seated and a pillion's seat 7r is supported by the seat frame 2c behind the fuel tank 5. The fuel tank 5 is supported by support portions 2bs, 2cs of the main frame 2b and the seat frame 2c via an elastic member not shown in the drawings.

A front end portion of a swing arm 8 which pivotally supports a rear wheel RW at a rear end portion thereof is swingably supported by the pivot frame 2e, and the swing arm 8 is suitably supported by a rear cushion not shown in the drawing. Power from the engine E is transmitted to the rear wheel RW via a chain 80 extended along the swing arm 8. An exhaust pipe 83a which passes below the engine E and extends toward a rear side of the engine E from a front side of the engine E is connected to the engine E, and an exhaust muffler 83 connected to the exhaust pipe 83a is disposed on a right outside of the swing arm 8.

A vehicle body is suitably covered by a cover member. As described previously, the seat frame 2c disposed on the rear portion of the vehicle is covered by a rear cowl 9 and a rear fender 42. The rear cover 9 surrounds side surfaces and a lower surface of the seat frame 2c from below a rear portion of the riding seat 7 and also covers an area including a surrounding of a tail light 82. The rear fender 42 covers an area above the rear wheel RW together with the rear cowl 9.

Within a lateral width of the pair of left and right seat frames 2c, a braking control device 10 and an inertia measuring device 20 are mounted on the rear fender 42 below the riding seat 7. The braking control device 10 is configured to control braking of the front wheel FW and the rear wheel RW, and is connected to the front wheel FW and the rear wheel RW via a hydraulic system, for example. The inertia measuring device 20 is configured to measure inertias in the X, Y and Z axes of the vehicle. In this specification, with respect to the inertias in the X, Y and Z axes, for example, the inertia in the X axis is an inertia in the longitudinal direction of the vehicle, the inertia in the Y axis is an inertia in the lateral direction of the vehicle, and the inertia in the Z axis is an inertia in the vertical direction of the vehicle.

Figure 2:
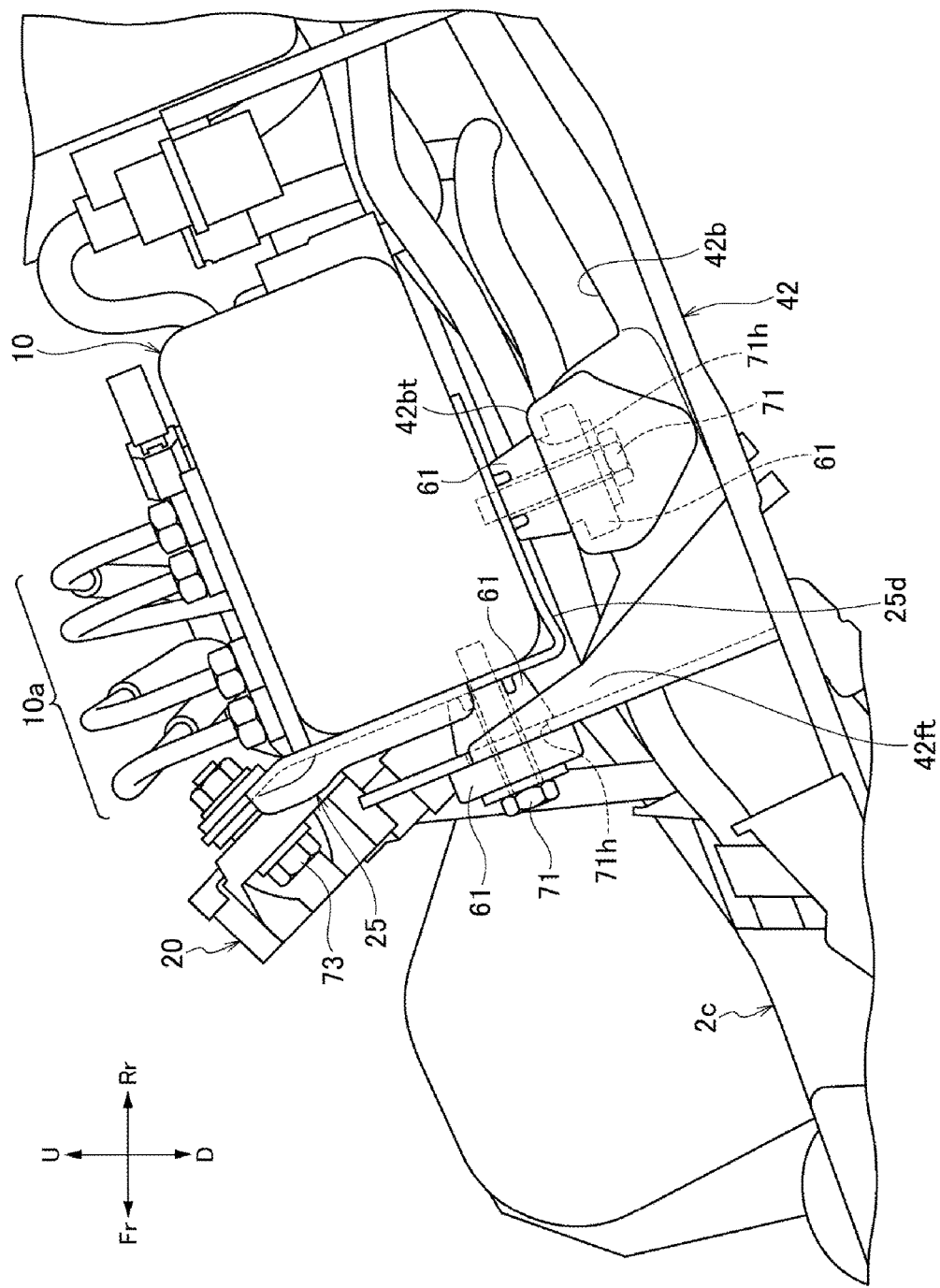
FIG. 2 is a left side view of a main part of the saddle-ride type vehicle shown in FIG. 1 for showing an inertia measuring device mounted on the saddle-ride type vehicle in an enlarged manner.

As shown in FIG. 2, the braking control device 10 is disposed in a frontwardly and downwardly inclined manner. That is, hydraulic tubes 10a are connected to an upper portion of the braking control device 10, the braking control device 10 is supported by a lower mounting portion 42bt formed on a bottom surface 42b of the rear fender 42 in a projecting manner from below, and a front side of the braking control device 10 is supported by a front mounting portion 42ft which projects higher than the lower mounting portion 42bt in front of the lower mounting portion 42bt. The braking control device 10 is fixed by bolts 71 which penetrate the lower mounting portion 42bt and the front mounting portion 42ft and threadedly engage with the braking control device 10. The bolts 71 are configured not to be brought into direct contact with the lower mounting portion 42bt and the front mounting portion 42ft due to vibration control members 61 having elasticity such as rubber. To be more specific, around bolt penetration holes 71h formed in the lower mounting portion 42bt and the front mounting portion 42ft, each vibration control member 61 is configured to cover a side where the vibration control member 61 is brought into contact with the braking control device 10, a side where the vibration control member 61 is brought into contact with a head portion of the bolt 71, and also an inner peripheral surface of the bolt insertion hole 71h. Accordingly, the fastening of the braking control device 10 by the bolts 71 is realized as the indirect fastening via the vibration control members 61 and hence, vibrations and an impact transmitted to the braking control device 10 from the rear fender 42 are more alleviated by the vibration control members 61.

In this embodiment, to the front mounting portion 42ft and the lower mounting portion 42bt, a mounting bracket 25 which supports the inertia measuring device 20 is co-fastened by the same bolts 71. Such co-fastening is performed such that a rear surface side of the mounting bracket 25 is brought into contact with the braking control device 10, and a front surface side and a lower surface side of the mounting bracket 25 are brought into contact with the vibration control member 61. In this manner, the mounting bracket 25 which supports the inertia measuring device 20 is supported by the braking control device 10 and hence, it is safety to say that the inertia measuring device 20 is also mounted on the rear fender 42 via the vibration control member 61.

Figure 3:
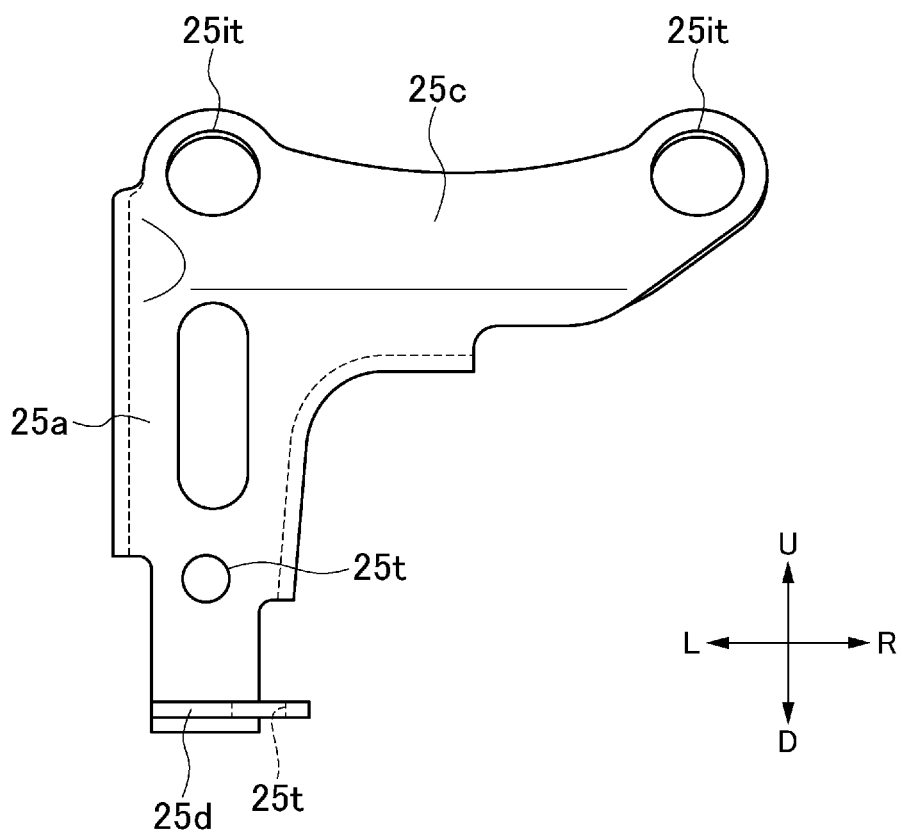
FIG. 3 is a front view of a mounting bracket for mounting the inertia measuring device shown in FIG. 2.

The mounting bracket 25 includes: a mounting trunk portion 25a which has an approximately L shape as viewed in a front view shown in FIG. 3 and in a side view shown in FIG. 2 and extends in a vertical direction; a support arm 25c which extends in a rightward direction on an upper end side of the mounting trunk portion 25a and supports the inertia measuring device 20; and a support arm 25d which extends in a rearward direction on a lower end side of the mounting trunk portion 25a and supports the inertia measuring device 20. A pair of inertia measuring device fixing portions 25it through which bolts 73 for mounting the inertia measuring device 20 (see FIG. 2) are made to pass is formed in both left and right ends of the support arm 25c. A co-fastening mounting portion 25t which is co-fastened to the front mounting portion 42ft by the bolt 71 is formed on a lower portion of the mounting trunk portion 25a. A co-fastening mounting portion 25t which is co-fastened to the lower mounting portion 42bt by the bolt 71 is formed on a rear portion of the support arm 25d. That is, the mounting bracket 25 is disposed such that the mounting trunk portion 25a and the support arm 25c are disposed in front of the braking control device 10, and the support arm 25d is disposed below the braking control device 10.

Figure 4:
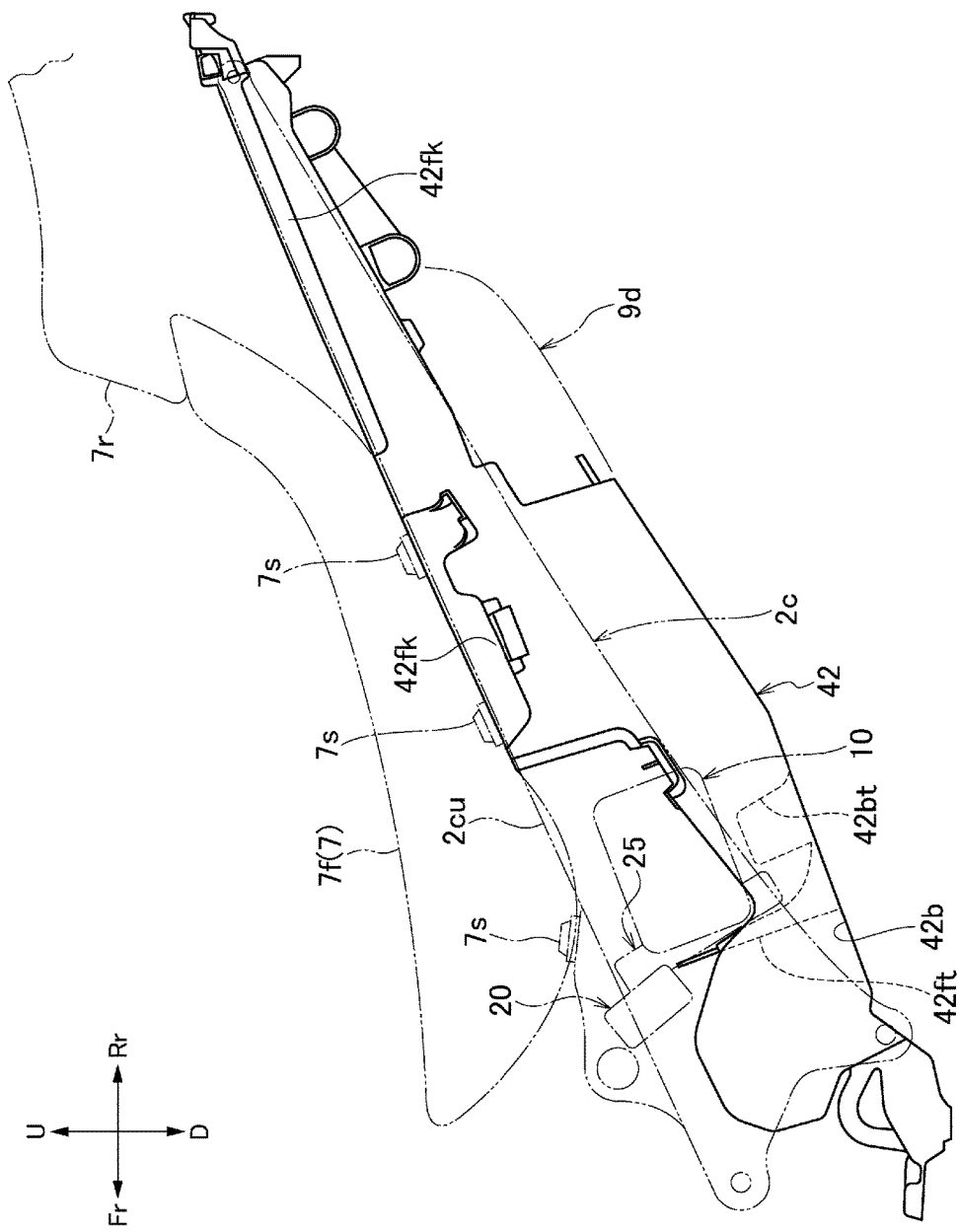
FIG. 4 is a left side view of a rear fender mounted on the saddle-ride type vehicle shown in FIG. 1.
Figure 5:
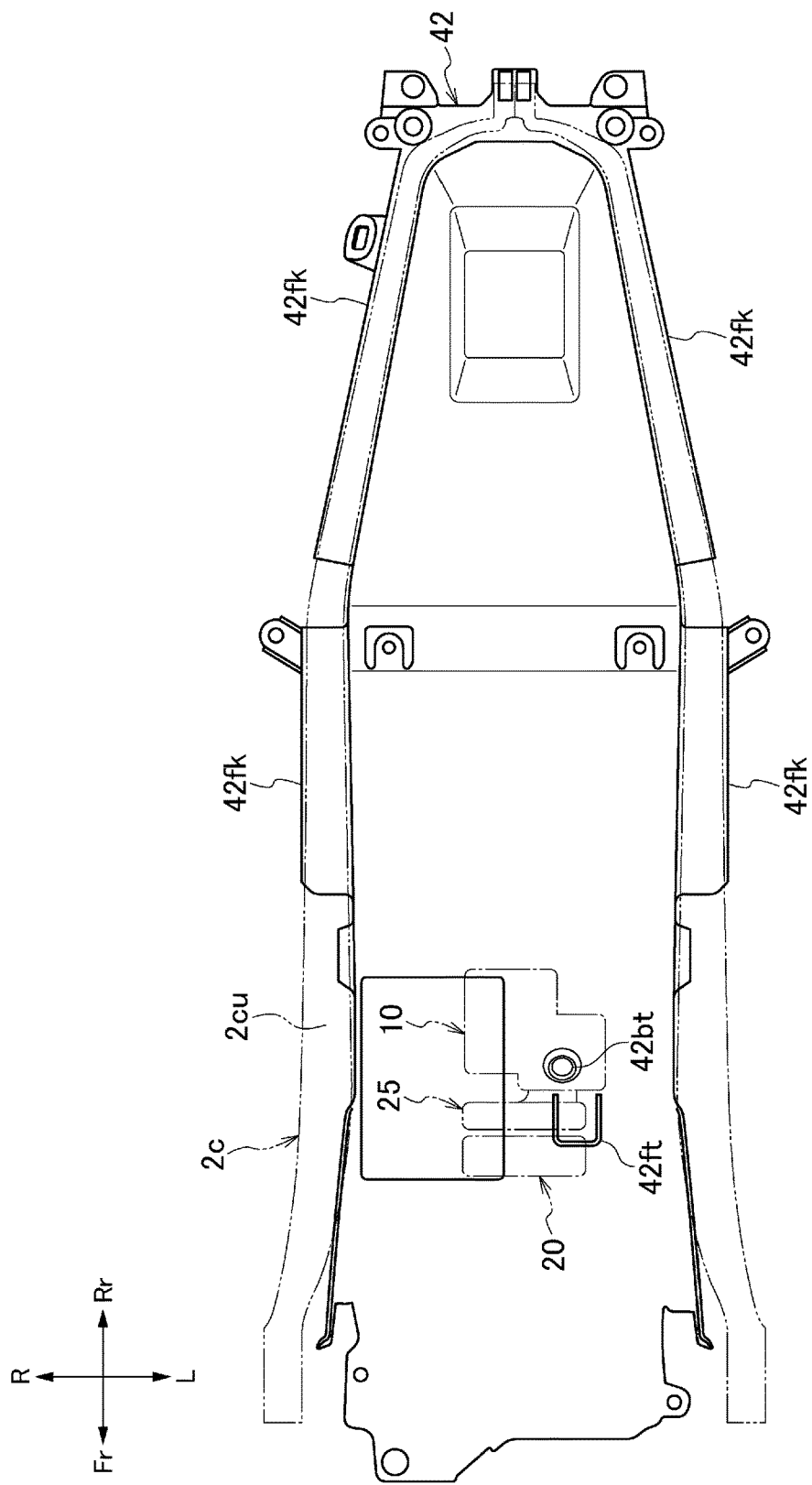
FIG. 5 is a plan view of the rear fender shown in FIG. 4.

As shown in FIG. 4 and FIG. 5, the rear fender 42 includes placing portions 42fk which are caught by upper surfaces 2cu of seat frames 2c. To be more specific, the placing portions 42fk are portions disposed on both left and right sides of the rear fender 42 (see FIG. 5) ranging from a middle portion to a rear portion in the longitudinal direction of the rear fender 42. Each placing portion 42fk is formed in a hook shape such that the placing portion 42fk extends upward from a lower position along an inner side of the seat frame 2c, passes over an upper surface 2cu, and extends downward along an outer side of the seat frame 2c. That is, each placing portion 42fk engages with each of the left and right seat frames 2c via wall surfaces thereof which opposedly face the inner side, the upper surface 2cu and the outer side of the seat frame 2c respectively. Accordingly, the position of the rear fender 42 relative to the seat frame 2c is restricted in the longitudinal direction of the vehicle as well as in the lateral direction of the vehicle.

Figure 6:
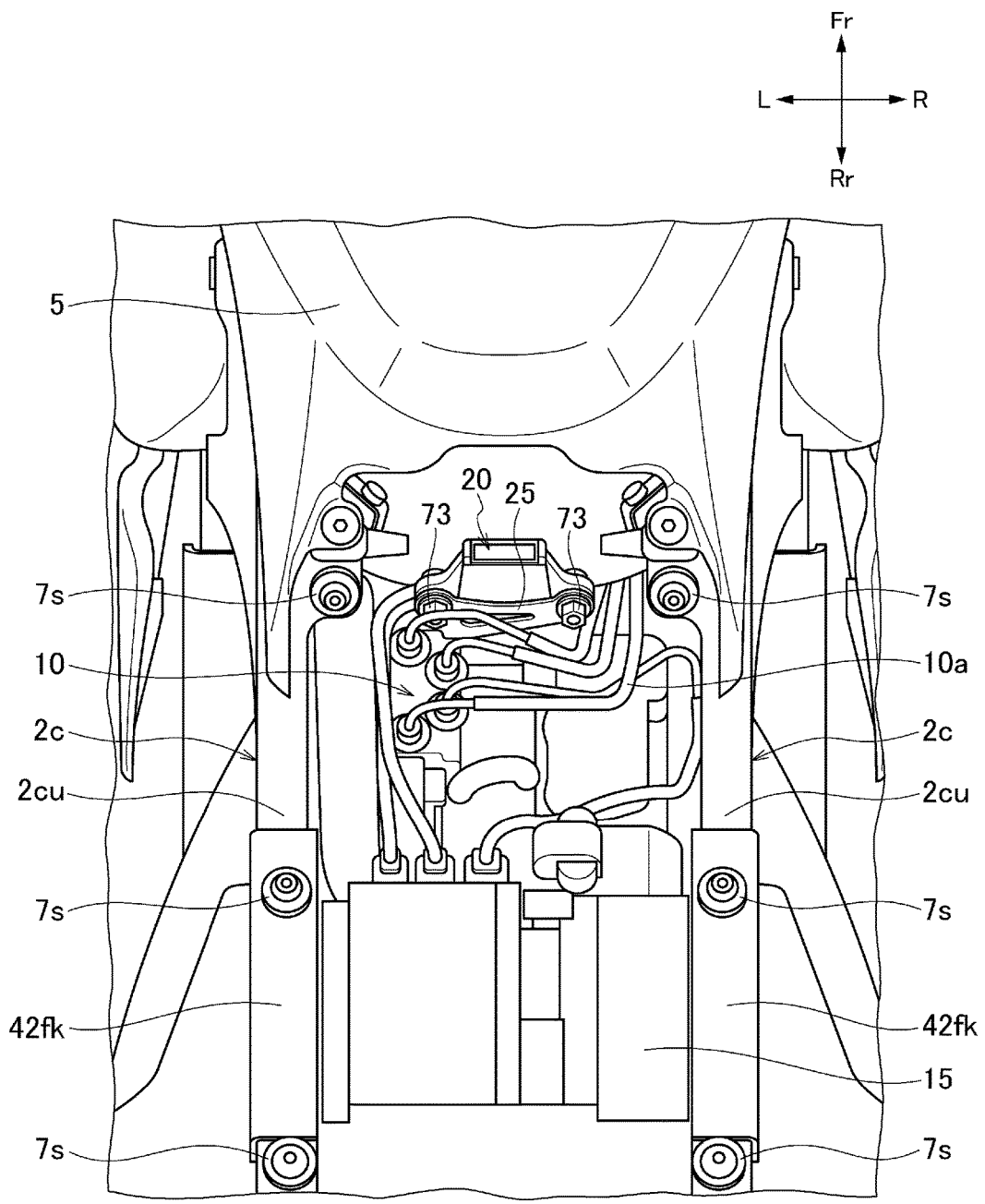
FIG. 6 is a schematic plan view of a lower side of a riding seat in the saddle-ride type vehicle shown in FIG. 1.

The riding seat 7 is placed on the rear fender 42 placed on the seat frames 2c. To be more specific, as shown in FIG. 6, the riding seat 7 is placed on the rear fender 42 such that, for example, the riding seat 7 is placed on seat support portions 7s which are disposed longitudinally on the placing portions 42fk on both sides where a battery 15 is disposed and seat support portions 7s which are disposed on the seat frames 2c on both left and right sides of the inertia measuring device 20. In this embodiment, the seat support portion 7s is formed of a member having elasticity such as rubber. To the rear fender 42, a rear cowl 9 (see FIG. 1) formed of upper cowls 9u which cover the upper surfaces 2cu of the seat frames 2c and lower cowls 9d which cover side surfaces and lower surfaces of the seat frames 2c is connected. Accordingly, a storing space which stores the braking control device 10, the inertial measuring device 20 and other electric components is formed by the rear fender 42, the riding seat 7 and the rear cowl 9.

Figure 8:
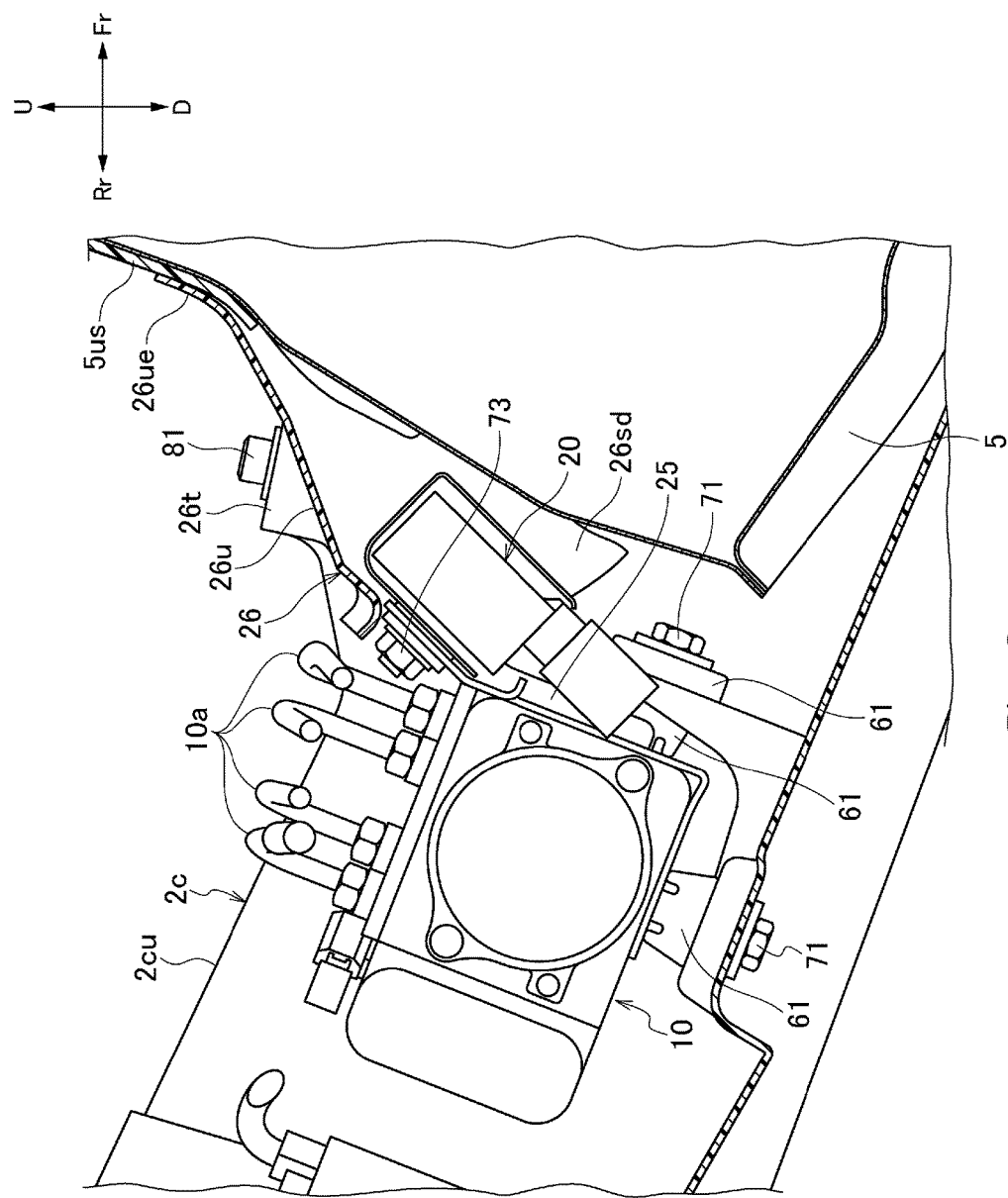
FIG. 8 is a cross-sectional view of a portion of the main part shown in FIG. 7 taken along a line A-A.

The inertia measuring device 20 is disposed behind the fuel tank 5 and in front of the braking control device 10 in the longitudinal direction of the vehicle. As shown in FIG. 8, the inertia measuring device 20 is disposed at a height where the inertia measuring device 20 overlaps with the fuel tank 5 and the braking control device 10 in a height direction.

Figure 7:
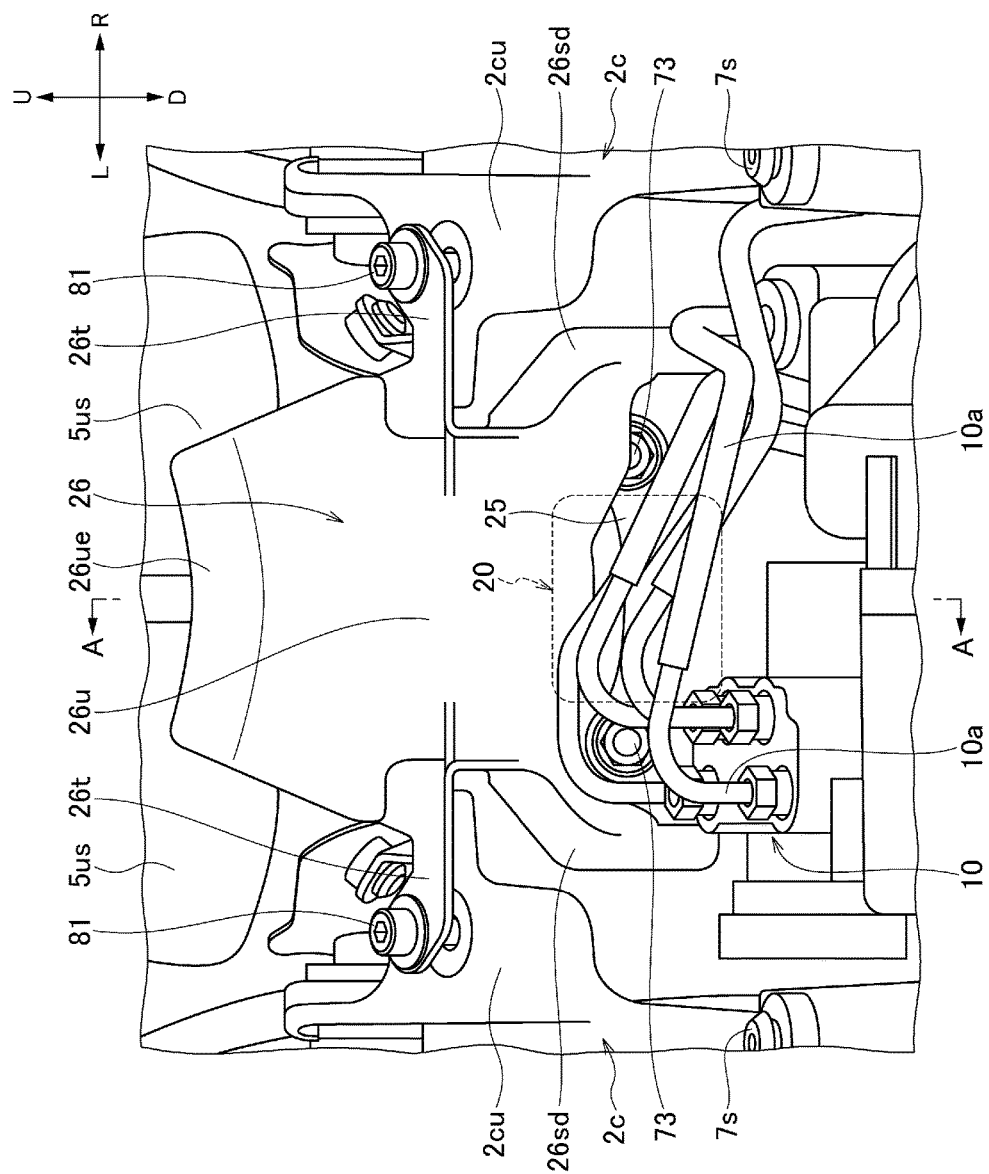
FIG. 7 is a schematic perspective view of a main part of the saddle-ride type vehicle where an inertia measuring device cover is mounted on the saddle-ride type vehicle.

As shown in FIG. 7 and FIG. 8, the inertia measuring device 20 is covered by an inertia measuring device cover 26 from above. The inertia measuring device cover 26 has: a cover upper surface 26u which covers an upper surface of the inertia measuring device 20 and extends toward a fuel tank 5 side; cover side surfaces 26sd which extend toward left and right sides and downward from the cover upper surface 26u and cover both left and right sides of the inertia measuring device 20; and a cover mounting portion 26t which extends toward left and right sides from the cover upper surface 26u and is fixed to the upper surfaces 2cu of the seat frames 2c by mounting bolts 81.

In the inertia measuring device cover 26, a distal end portion 26ue of the cover upper surface 26u is brought into contact with the fuel tank 5. In this embodiment, the fuel tank 5 has: a portion with which the distal end portion 26ue of the cover upper surface 26u is brought into contact; and a cushion member 5us such as sponge disposed around the portion. In this manner, the inertia measuring device cover 26 is fixed to the upper surfaces 2cu of the seat frames 2c in a state where the inertia measuring device cover 26 is brought into contact with the fuel tank 5. In this specification, "contact" is not limited to a direct contact and includes an indirect contact where the inertia measuring device cover 26 is indirectly brought into contact with the fuel tank 5 via a buffer member such as a sponge.

Although the fuel tank 5 is supported by the main frame 2b as described above, for example, the fuel tank 5 may be mounted on the main frame 2b via an elastic member when necessary.

As has been explained heretofore, according to the saddle-ride type vehicle 1 of this embodiment, the braking control device 10 is disposed within a lateral width of the seat frames 2c, and is supported by the rear fender 42 which is supported by the seat frames 2c via the vibration control member 61, and the inertia measuring device 20 is supported by the braking control device 10. With such a configuration, the inertia measuring device 20 is brought into a state where the inertia measuring device 20 is mounted via the vibration control member 61 of the braking control device 10 disposed below the riding seat 7 between the seat frames 2c. Accordingly, the braking control device 10 can be mounted without additionally providing the mounting structure such as a vibration isolation member for the inertia measuring device 20. The inertia measuring device 20 is supported by the braking control device 10 which is a heavy object and hence, vibrations transmitted to the inertia measuring device 20 can be reduced so that inertia measuring accuracy can be enhanced.

The braking control device 10 is supported by the rear fender 42 via the vibration control member 61 by the bolt 71, and the inertia measuring device 20 is supported by the mounting bracket 25 which is co-fastened also by this bolt 71. Accordingly, it is unnecessary to provide the vibration control member or the bolt exclusively for mounting the inertia measuring device 20 and hence, the number of parts can be reduced and the increase of the weight can be prevented.

The braking control device 10 is disposed in a frontwardly and downwardly inclined manner, and the mounting bracket 25 is disposed in front of and below the braking control device 10 so that the mounting bracket 25 is co-fastened to the inertia measuring device 20 by the bolt 71. Accordingly, the weight of the braking control device 10 is received by two vibration control members 61, and the weight of the braking control device 10 can be placed also on the mounting bracket 25.

The rear fender 42 is supported by the seat frames 2c via the placing portion 42fk on which the rear fender 42 is placed by being caught by the upper surfaces 2cu of the seat frames 2c, and the riding seat 7 is disposed above the rear fender 42. Accordingly, the seat frames 2c which surround the inertia measuring device 20 and the rear fender 42 are not fixed by the fastening means such as bolts and hence, the transmission of vibrations or a stress to the inertia measuring device 20 is alleviated whereby the transmission of vibrations to the inertia measuring device 20 can be effectively suppressed.

The inertia measuring device 20 is disposed at the position where the inertia measuring device 20 is sandwiched between the fuel tank 5 and the braking control device 10 which are heavy objects from a front side and a back side at the same height as the fuel tank 5 and the braking control device 10. Accordingly, the inertia measuring device 20 can be disposed at the position higher than the engine E and hence, inclination detection accuracy in the lateral direction of the vehicle can be improved. The inertia measuring device 20 is, together with the braking control device 10, disposed behind the fuel tank 5, that is, disposed on a rear portion of the vehicle body and hence, detection accuracy of detecting pitching which is a phenomenon that the rear wheel RW comes off from a ground can be preferably enhanced.

The inertia measuring device cover 26 is brought into contact with the fuel tank 5 and is supported by the seat frames 2c and hence, the inertia measuring device cover 26 can be surely supported by the fuel tank 5 and the seat frames 2c. Supporting of the inertia measuring device cover 26 by the fuel tank 5 is realized by bringing the inertia measuring device cover 26 into contact with the fuel tank 5 and hence, it is unnecessary to provide a particular structure for supporting such as bosses to the fuel tank 5 whereby it is possible to prevent the structure from becoming complicated and from increasing a weight thereof.

Second Embodiment

A saddle-ride type vehicle according to the second embodiment is described hereinafter with reference to FIG. 9 and FIG. 10. The saddle-ride type vehicle according to the second embodiment is equal to the saddle-ride type vehicle 1 according to the first embodiment except for a point that an inertia measuring device 20 is mounted on a fuel tank 5. Accordingly, the constitutional elements identical with the corresponding constitutional elements of the first embodiment are given same symbols and the description of these constitutional elements is omitted.

Figure 9:
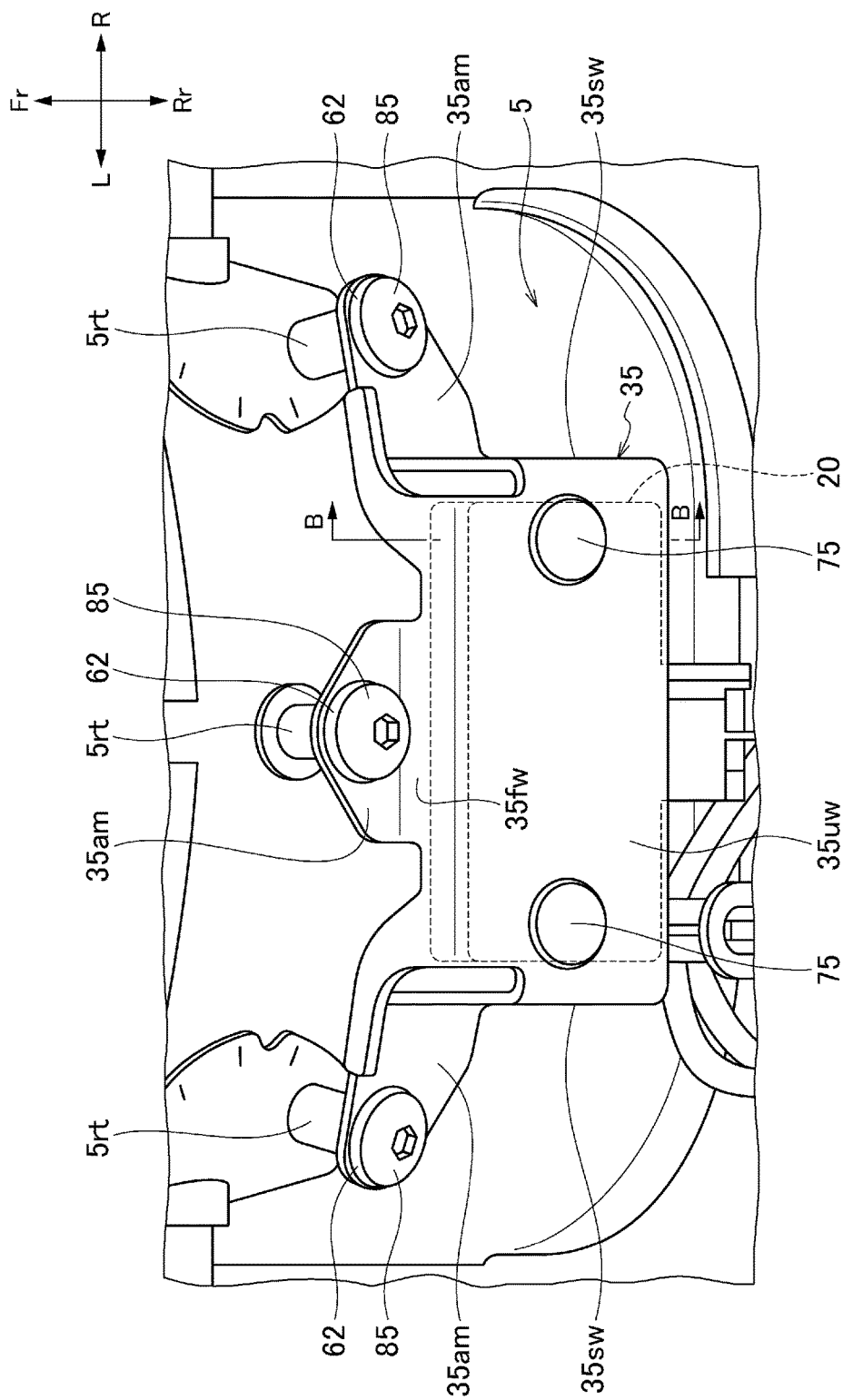
FIG. 9 is a perspective view of a main part of a saddle-ride type vehicle according to a second embodiment.
Figure 10:
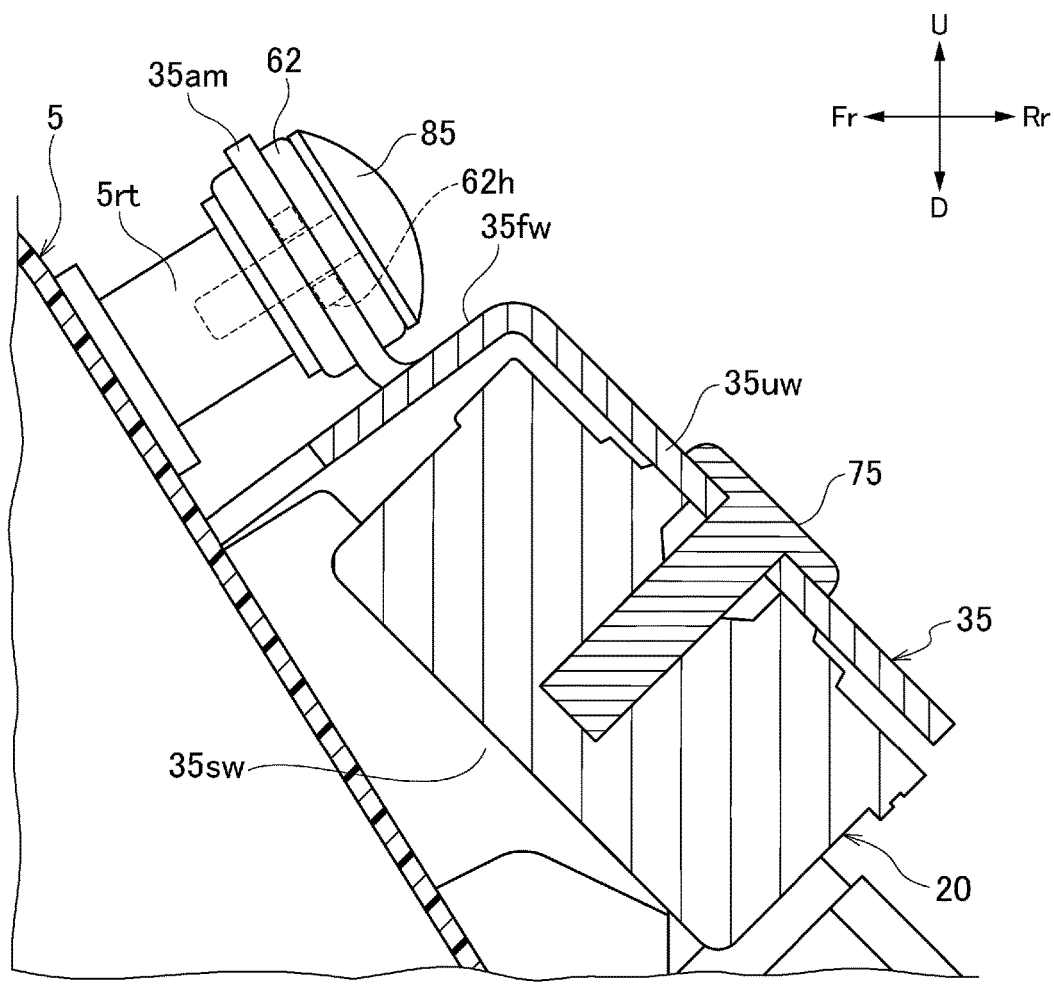
FIG. 10 is a cross-sectional view of a portion of the main part shown in FIG. 9 taken along a line B-B.

As shown in FIG. 9 and FIG. 10, the inertia measuring device 20 according to this embodiment is supported by the fuel tank 5 which is supported by an upper side of a main frame 2b. To be more specific, the inertia measuring device 20 is mounted on the fuel tank 5 via a storing part mounting bracket 35.

The storing part mounting bracket 35 includes: a bracket upper surface wall 35uw which covers an upper surface of the inertia measuring device 20 and opposedly faces a front surface of the fuel tank 5; bracket side surface walls 35sw which extend toward the front surface of the fuel tank 5 from the bracket upper surface wall 35uw so as to cover both left and right side surfaces of the inertia measuring device 20; a bracket front surface wall 35fw which extends toward the surface of the fuel tank 5 from the bracket upper surface wall 35uw such that the bracket front surface wall 35fw covers the front surface of the inertia measuring device 20; a pair of left and right mounting arms 35am which extend to a left side and a right side approximately along the surface of the fuel tank 5 from the bracket side surface walls 35sw; and mounting arms 35am on a front side which extend frontward and upward from the bracket front surface wall 35fw along the surface of the fuel tank 5. The storing part mounting bracket 35 is fixed to three bracket mounting portions 5rt formed on a rear surface of the fuel tank 5 in a projecting manner by bolts 85 which penetrate the mounting arms 35am.

The inertia measuring device 20 is fixed to the bracket upper surface wall 35uw by two left and right fixing pins 75, for example. A vibration control member 62 having elasticity such as rubber is interposed between the mounting arm 35am and the bolt 85. To be more in detail, as shown in FIG. 10, the vibration control member 62 is mounted in a bolt penetration hole 62h formed in the mounting arm 35am. That is, the vibration control member 62 is mounted so as to cover both front and back surfaces around the bolt penetration hole 62h formed in the mounting arm 35am (the surface on a side which is brought into contact with a head portion of the bolt 85 and the surface on a side which is brought into contact with the bracket mounting portion 5rt) and also an inner peripheral surface of the bolt penetration hole 62h. Accordingly, the mounting arm 35am is mounted via the vibration control member 62 without being brought into contact with the bolt 85 and the bracket mounting portion 5rt.

As has been described heretofore, according to the saddle ride-type vehicle 1 of this embodiment, the fuel tank 5 is supported by the main frame 2b, and the inertia measuring device 20 is supported by the storing part mounting bracket 35 provided to the fuel tank 5 via the vibration control member 62. Accordingly, the inertia measuring device 20 can be disposed on an upper portion of a vehicle body, and the inertia measuring device 20 is supported by the fuel tank 5 which is a heavy object via the vibration control member 62 and hence, vibrations can be reduced. As a result, measurement accuracy of the inertia measuring device 20 can be enhanced. Particularly, the fuel tank 5 is disposed between a handle 4 and a rider's seat 7f, is heavy in weight and is disposed over a whole lateral width of a vehicle body and hence, inertia which is equal to inertia which an occupant feels can be measured.

The present invention is not limited to the above-mentioned embodiments and the present invention can be modified or improved as desired.

For example, in the above-mentioned embodiment, the mounting bracket 25 is fastened to the front-side mounting portion 42ft and the lower-side mounting portion 42bt of the rear fender 42 by the co-fastening mounting portions 25t disposed at two places of the mounting bracket 25. However, the present invention is not limited to such a configuration, and the mounting bracket 25 may be fastened to the rear fender 42 at one place or three or more places. Hereinafter, the description is made with respect to a mounting bracket 25 according to a modification where the mounting bracket 25 is fastened at one place with reference to FIG. 11.

Figure 11:
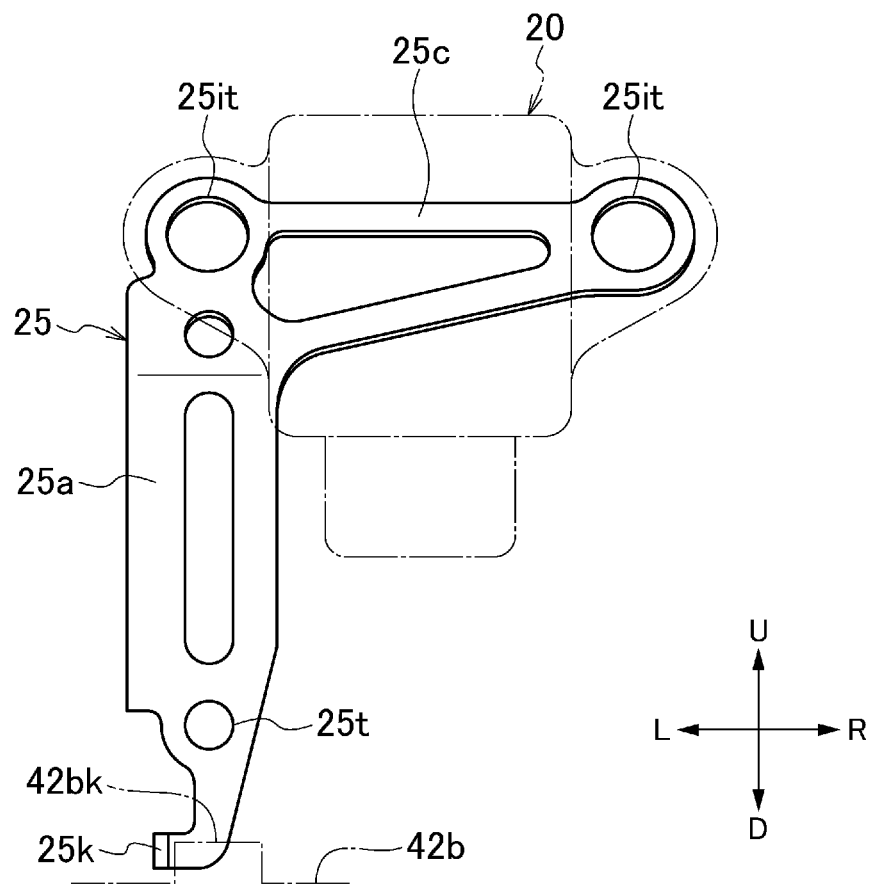
FIG. 11 is a front view of a mounting bracket of a saddle-ride type vehicle according to a modification of the second embodiment.

The mounting bracket 25 according to the modification includes: a mounting trunk portion 25a which has an approximately L shape as viewed in a front view shown in FIG. 11 and extends in a vertical direction; and a support arm 25c which extends in a rightward direction on an upper end side of the mounting trunk portion 25a and supports the inertia measuring device 20. A pair of inertia measuring device fixing portions 25it through which bolts 73 for mounting the inertia measuring device 20 are made to pass is formed in both left and right ends of support arm 25c. A co-fastening mounting portion 25t which is co-fastened to the front mounting portion 42ft by a bolt 71 is formed on a lower portion of the mounting trunk portion 25a. An engaging portion 25k which engages with a bottom surface engaging portion 42bk formed on a bottom surface 42b of the rear fender 42 in a projecting manner is formed on the lower portion of the mounting trunk portion 25a below the co-fastening mounting portion 25t.

The mounting bracket 25 has the engaging portion 25k for locking the mounting bracket 25 by thread engagement only at one place of the co-fastening mounting portion 25t. In view of such a configuration, the engaging portion 25k is provided for preventing the rotation of the mounting bracket 25. The engaging portion 25k is formed such that a distal end of the engaging portion 25k is bent with respect to the mounting trunk portion 25a such that the distal end of the engaging portion 25k is caught by a bottom surface locking portion 42bk. With such a configuration, for example, when the bolt 71 is made to penetrate the co-fastening mounting portion 25t and is fastened, the engaging portion 25k is caught by the bottom surface locking portion 42bk and hence, the mounting bracket 25 can be locked without being influenced by the rotation of the bolt 71.

The mounting bracket 25 includes the engaging portion 25k which engages with the rear fender 42 and restricts the rotation of the mounting bracket 25 and hence, even when the number of bolts 71 for fixing the mounting bracket 25 is set to one, it is possible to surely fix the mounting bracket 25 without causing the rotation of the mounting bracket 25. Accordingly, the increase of the number of parts and the increase of the weight can be suppressed without additionally providing bolts for fixing the mounting bracket 25 and a vibration control member.

In the above-mentioned embodiments, the braking control device 10 and the fuel tank 5 are utilized as a heavy object on which the inertia measuring device 20 is mounted. However, the present invention is not limited to such configuration, and other heavy objects may be utilized. The structure may be adopted where a dummy heavy object is prepared as another heavy object, and the inertia measuring device 20 may be mounted on the dummy heavy object.

In the above-mentioned embodiments, the structure is adopted where the vibration control members 61, 62 are mounted in the bolt insertion holes 71*h*, 62*h*. However, in place of the structure where the vibration control members 61, 62 are mounted in the bolt insertion holes 71*h*, 62*h*, the structure may be adopted where the vibration control members 61, 62 cover only both front and back surface sides of the bolt insertion holes 71*h*, 62*h* without covering inner peripheral surfaces of the bolt insertion holes 71*h*, 62*h*.

In the above-mentioned embodiments, the description has been made with respect to the motorcycle. However, the present invention is also applicable to other saddle ride-type vehicle.

The invention claimed is:

1. A saddle-ride type vehicle (1) including:
   a main frame (2*b*);
   a drive source (E) supported by a lower side of the main frame (2*b*);
   an energy storing part (5) supported by an upper side of the main frame (2*b*);
   a front wheel (FW) steerably supported via a front fork (3) mounted on a front side of the main frame (2*b*);
   a rear wheel (RW) supported via a swing arm (8) mounted on a rear side of the main frame (2*b*) and configured to be driven by the drive source (E);
   seat frames (2*c*) disposed on the rear side of the main frame (2*b*) to support a riding seat (7),
   a braking control device (10) disposed within a lateral width between the seat frames (2*c*) and configured to control braking of the front wheel (FW) or the rear wheel (RW); and
   an inertia measuring device (20) configured to measure inertias in X, Y and Z axes of the vehicle,
   wherein a rear fender (42) is supported by the seat frames (2*c*) and the braking control device (10) is supported by the rear fender via a vibration control member (61), and
   wherein the inertia measuring device (20) is supported by the braking control device (10).

2. The vehicle (1) of claim 1,
   wherein the braking control device (10) is supported by a bolt (71) fastened to the rear fender (42) via the vibration control member (61), and
   wherein the inertia measuring device (20) is supported by a mounting bracket (25) which is co-fastened to the bolt (71).

3. The vehicle (1) of claim 2,
   wherein the braking control device (10) is disposed in a frontwardly and downwardly inclined manner, and
   wherein the mounting bracket (25) is disposed in front of and below the braking control device (10).

4. The vehicle (1) of claim 2,
   wherein the mounting bracket (25) includes an engaging portion (25*k*) which engages with the rear fender (42) and restricts the rotation of the mounting bracket (25).

5. The vehicle (1) of claim 2,
   wherein the rear fender (42) is supported by the seat frame (2*c*) via a placing portion (42*fk*) on which the rear fender (42) is placed by being caught by an upper surface (2*cu*) of the seat frame (2*c*), and
   wherein the riding seat (7) is disposed above the rear fender (42).

6. The vehicle (1) of claim 1,
   wherein the inertia measuring device (20) is disposed behind the energy storing part (5) and in front of the braking control device (10), and the inertia measuring device (20) is disposed at a height where the inertia measuring device (20) overlaps with the energy storing part (5) and the braking control device (10) in a longitudinal direction of the vehicle.

7. The vehicle (1) of claim 6,
   wherein the inertia measuring device (20) is covered by an inertia measuring device cover (26) from above, and the inertia measuring device cover (26) is brought into contact with the energy storing part (5) and is supported by the seat frame (2*c*).

* * * * *